(12) United States Patent
Hermann et al.

(10) Patent No.: US 8,268,469 B2
(45) Date of Patent: Sep. 18, 2012

(54) BATTERY PACK GAS EXHAUST SYSTEM

(75) Inventors: Weston Arthur Hermann, Palo Alto, CA (US); Alan Paul Clarke, Long Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/076,003

(22) Filed: Mar. 30, 2011

(65) Prior Publication Data

US 2011/0174556 A1    Jul. 21, 2011

Related U.S. Application Data

(63) Continuation-in-part of application No. 12/386,684, filed on Apr. 22, 2009, which is a continuation-in-part of application No. 12/798,198, filed on Mar. 30, 2010.

(60) Provisional application No. 61/426,254, filed on Dec. 22, 2010.

(51) Int. Cl.
*H01M 2/02* (2006.01)
*H01M 2/08* (2006.01)
*H01M 2/12* (2006.01)
*H01M 10/50* (2006.01)
*B65D 51/16* (2006.01)
*B60K 1/04* (2006.01)

(52) U.S. Cl. ............ 429/62; 429/163; 429/185; 429/82; 220/373; 180/65.1

(58) Field of Classification Search .................... 429/62, 429/61, 63, 57, 430, 174, 115, 185, 82, 163; 180/65.1; 220/373, 367.1
See application file for complete search history.

(56) References Cited

U.S. PATENT DOCUMENTS 2,094,329 A    9/1937    Mascuch
(Continued)

FOREIGN PATENT DOCUMENTS

CN    201 732 847    2/2011
(Continued)

OTHER PUBLICATIONS

Machine Translation of: JP 2006/185894 A, Nakano, H., Jul. 13, 2006.*
(Continued)

*Primary Examiner* — Jonathan Crepeau
*Assistant Examiner* — Kenneth Douyette
(74) *Attorney, Agent, or Firm* — Patent Law Office of David G. Beck

(57) ABSTRACT

A thermal management system is provided that minimizes the effects of thermal runaway within a battery pack. The system is comprised of a multi-sided, substantially airtight battery pack enclosure configured to hold a plurality of batteries, where at least one side of the battery pack enclosure includes at least one cavity. An inner wall of the enclosure includes a plurality of perforations configured to pass gas from within the enclosure to the cavity within the at least one side member. The system is further comprised of at least one gas exhaust port integrated into an outer wall of the enclosure and configured to pass gas from within the cavity of the enclosure side member to the ambient environment when one or more batteries contained within the battery pack undergo thermal runaway.

32 Claims, 11 Drawing Sheets

U.S. PATENT DOCUMENTS

| | | |
|---|---|---|
| 3,166,446 A | 1/1965 | Hutchison |
| 3,201,284 A | 8/1965 | Ellis |
| 3,834,945 A | 9/1974 | Jensen |
| 4,482,613 A | 11/1984 | Turchan et al. |
| 4,804,593 A | 2/1989 | Hara et al. |
| 2003/0070706 A1 | 4/2003 | Fujioka |
| 2005/0029986 A1 | 2/2005 | Morgan |
| 2005/0170238 A1 | 8/2005 | Abu-Isa et al. |
| 2006/0068278 A1 | 3/2006 | Bloom et al. |
| 2007/0178377 A1* | 8/2007 | Kim et al. .................... 429/152 |
| 2008/0050645 A1 | 2/2008 | Kai et al. |
| 2008/0220321 A1 | 9/2008 | Yonemochi et al. |
| 2008/0241644 A1 | 10/2008 | Crowe et al. |
| 2008/0318121 A1* | 12/2008 | Takagi ......................... 429/120 |
| 2009/0220850 A1 | 9/2009 | Bitsche et al. |
| 2010/0136404 A1 | 6/2010 | Hermann et al. |
| 2010/0178552 A1 | 7/2010 | Kim et al. |
| 2010/0183910 A1 | 7/2010 | Nishino et al. |
| 2011/0027632 A1 | 2/2011 | Higashino et al. |

FOREIGN PATENT DOCUMENTS

| | | |
|---|---|---|
| EP | 0 068 837 | 1/1983 |
| EP | 2 161 768 A1 | 3/2010 |
| JP | 2004039358 A | 2/2004 |
| JP | 2006185894 A * | 7/2006 |
| JP | 2009054303 A * | 3/2009 |
| WO | WO 2005122294 A1 | 12/2005 |

OTHER PUBLICATIONS

Machine Translation of: JP 2009054303 A, Maeda, Mar. 12, 2009.*

* cited by examiner

BATTERY PACK GAS EXHAUST SYSTEM

CROSS-REFERENCE TO RELATED APPLICATION

This application is a continuation-in-part of U.S. patent application Ser. Nos. 12/386,684, filed 22 Apr. 2009, and 12/798,198, filed 30 Mar. 2010, and claims the benefit of the filing date of U.S. Provisional Patent Application Ser. No. 61/426,254, filed 22 Dec. 2010, the disclosures of which are incorporated herein by reference for any and all purposes.

FIELD OF THE INVENTION

The present invention relates generally to batteries and, more particularly, to means for mitigating the effects and hazards associated with a battery pack thermal event.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure. While the safety pressure release vent built into many cells may help to release some of the gas generated by the reaction, eventually the increased temperature in concert with the increased internal cell pressure will lead to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and to lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to the vehicle's passengers leaving the vehicle, or to first responders attempting to control the event, becomes quite significant.

Accordingly, it is desirable to delay the escape of hot gas from the cell or cells undergoing thermal runaway for as long as possible, and then to control the point of egress of the hot gas to the ambient environment. Similarly, it is desirable to lower the temperature of the hot gas before it reaches the ambient environment, thereby further lowering the risks to passengers, bystanders and first responders, as well as reducing the potential for the spontaneous combustion of materials in proximity to the event. The present invention provides a system and method for achieving these goals, thereby limiting collateral damage and the risk to first responders and others.

SUMMARY OF THE INVENTION

The present invention provides a thermal management system for minimizing the effects of thermal runaway occurring within one or more batteries contained within a battery pack. In accordance with the invention, the system is comprised of a multi-sided, substantially airtight battery pack enclosure configured to hold a plurality of batteries, where at least one side member of the battery pack enclosure includes at least one cavity and an inner wall of the enclosure includes a plurality of perforations that are configured to pass gas from within the enclosure to the at least one cavity within the at least one side member. The perforations may each include a one-way valve or a sealing layer designed to fail at a preset pressure. The system of the invention is further comprised of at least one gas exhaust port integrated into an outer wall of the battery pack enclosure and in gaseous communication with the at least one cavity, where the at least one gas exhaust port is configured to pass gas from within the at least one cavity to the ambient environment external to the battery pack enclosure when one or more batteries undergo thermal runaway. The exhaust port may be comprised of a cap assembly configured to seal the exhaust port under normal operating conditions and to unseal and pass gas from the at least one cavity within the at least one side member to the ambient environment during a thermal runaway event. The cap assembly may be comprised of a one way valve, alone or in combination with a valve mounting member that is configured to melt during a thermal runaway event. The cap assembly may be comprised of a cover configured to melt during a thermal runaway event. The exhaust port may include a nozzle that directs the flow of hot gas expelled through the exhaust port.

In at least one embodiment, the at least one cavity within the at least one side member of the battery pack enclosure is comprised of at least first and second cavities separate from one another. In this embodiment, the plurality of perforations are configured to pass gas from within the enclosure to the first cavity and a second plurality of perforations, also included on the inner wall(s) of the enclosure, are configured to pass gas from within the enclosure to the second cavity. Preferably the same gas exhaust port is coupled to both the first and second cavities. The first and second plurality of perforations may each include a one-way valve or a sealing layer designed to fail at a preset pressure.

In at least one embodiment, four battery pack enclosure side members include the at least one cavity, where the at least one cavity within each side member is in gaseous communication with the at least one cavity within the other side members. Preferably a portion of the perforations are included on the inside enclosure wall of each of the four battery pack enclosure side members.

In at least one embodiment, the battery pack enclosure is configured to be mechanically and thermally coupled to a thermal mass that is external to, and separate from, the battery pack enclosure. The thermal energy of the gas passing through the cavity or cavities within the side member or members of the enclosure is transferred via thermal conduction and thermal radiation from the side member(s) to the thermal mass. The thermal mass may be comprised of one or more structural members of an electric vehicle (e.g., rocker panels) in which the battery pack is incorporated.

In at least one embodiment, the battery pack enclosure further comprises a plurality of cross-members that segregate the plurality of batteries into groups of batteries. Preferably the cross-members present a thermal barrier to the transfer of thermal energy between groups of batteries located on either side of each cross-member. The cross-members may include one or more cavities. The cavity or cavities within the cross-members may contain nothing, or be filled with a high melting temperature, low thermal conductivity material, or filled with a stagnant liquid (e.g., contained within pouches), or filled with liquid contained within a tube (e.g., a cooling tube).

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a non-plug-in hybrid vehicle, also referred to as a HEV, where a hybrid vehicle utilizes multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

When a single battery within a battery pack undergoes thermal runaway, the thermal energy generated by the event can have far-reaching consequences. First, due to the increase in temperature and the related release of hot gas and materials, the temperature of other cells within close proximity to the initially affected cell may increase sufficiently to cause them to enter into a state of thermal runaway which, in turn, may lead to other cells entering into thermal runaway. Therefore the initial thermal event may propagate throughout the battery pack, leading to a much larger thermal event within the pack. Second, as the cell or cells within the pack enter into thermal runaway, the associated increase in pressure may lead to a catastrophic failure of the battery pack enclosure. Unless the battery pack enclosure includes one or more failure points that have been designed to fail at a predetermined pressure, the point of failure will be unknown, resulting in increased risk to passengers, by-standers and first responders depending upon where the random failure point occurs. Third, if the temperature of the gas and material escaping from the battery pack is not lowered prior to its release, the ATI of the combustible materials in proximity to the release point may decrease significantly, potentially leading to their spontaneous combustion. Thus if the egress point is located near a passenger, bystander or first responder, the consequences may be disastrous.

Figure 1:
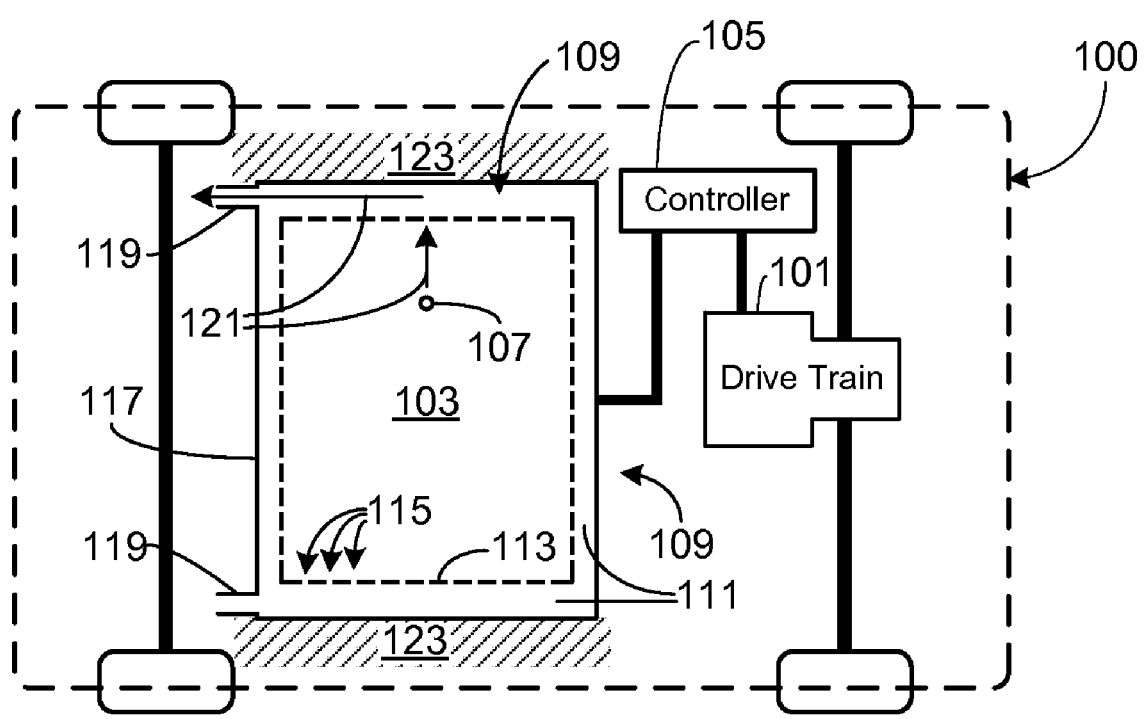
FIG. 1 illustrates the basic elements of a battery pack system designed to control the release of hot gas and material from a thermal event occurring within the pack.

To overcome these problems, and as schematically illustrated in FIG. 1, the present invention controls the release of hot gas and material accompanying a thermal runaway event, both in terms of release location and the temperature of the released material. Although the system is shown implemented in an electric vehicle, i.e., electric vehicle 100, it should be understood that the illustrated concepts and structures may be used with other systems utilizing a large battery pack (e.g., boats, residential or commercial battery systems, etc.). For illustration purposes, the drive system shown in FIG. 1 uses a single electric motor coupled to the drive axle via a transmission/differential assembly, i.e., drive train 101. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Drive train 101 is coupled to battery pack 103 via a power control module 105, module 105 typically including a DC to AC converter. Power control module 105 insures that the power delivered to the electric motor has the desired voltage, current, waveform, etc. As such, power control module 105 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

Battery pack 103 is comprised of a plurality of batteries. In at least one embodiment, the batteries contained within battery pack 103 are segregated into modules, thus simplifying manufacturing and repair while meeting the desired electrical design and performance goals. In FIG. 1 only a single exemplary battery 107 is shown.

In accordance with the invention, a portion of the battery pack enclosure includes hollow structural elements. For example, in the preferred embodiment and as described in detail below, the side members 109 of battery pack 103 are hollow and include at least one cavity 111, also referred to herein as a lumen. The inner walls 113 of side members 109 include a plurality of perforations 115 that allow gas communication between the interior of battery pack 103 and lumen(s) 111.

During a thermal event, for example one arising in cell 107, the gas and material generated by the event passes through perforations 115 into the cavity or cavities 111 formed within the hollow structural elements 109 of battery pack 103. The gas then flows through cavity or cavities 111 to one or more battery pack gas exhaust ports 119, for example by following a pathway 121, at which point the gas then flows out of the battery pack. Preferably the exhaust ports include a cover or valve, not shown, that insures that they remain closed until the occurrence of a thermal event within the battery pack. In at least one embodiment of the invention, ports 119 include a nozzle that minimizes the risks to passengers, bystanders and first responders by directing the flow of gas away from the passenger compartment as well as any location where someone could be struck by the escaping gas. In addition, preferably the nozzle on each port 119 directs the flow of hot gas in a direction intended to minimize vehicle damage.

In addition to providing a controlled gas exhaust pathway for battery pack 103, the present invention also helps to minimize potential damage by significantly lowering the temperature of the gas prior to its escape through gas exhaust ports 119. As described more fully below, the hollow structural members 109 of pack 103 are mechanically and thermally coupled to major structures 123 within vehicle 100. As a result, as the hot gas generated during the thermal event passes down lumen(s) 111, heat is withdrawn and transferred to large thermal masses 123, thereby lowering the temperature of the gas before it leaves the confines of the battery pack.

Figure 2:
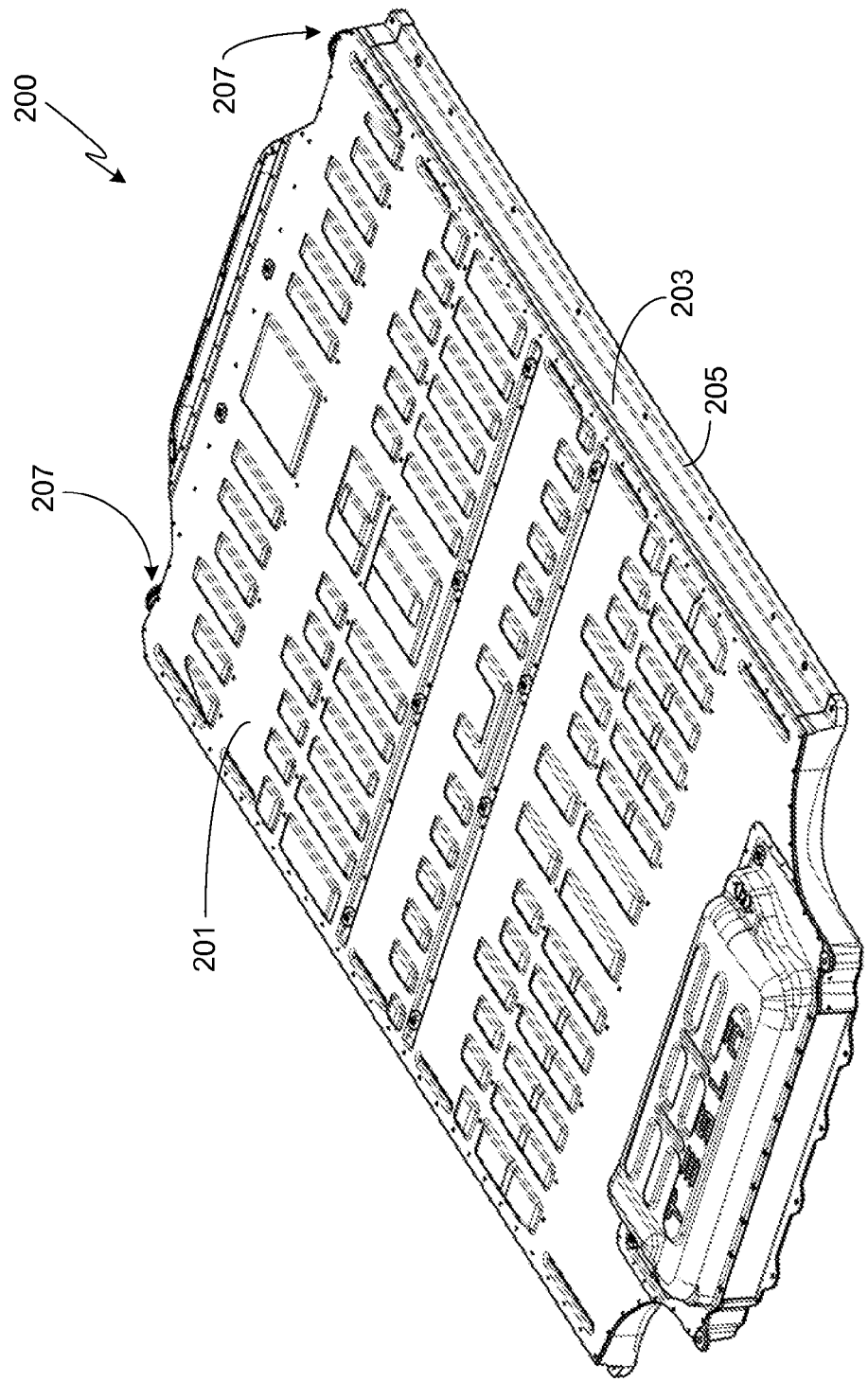
FIG. 2 provides a perspective view of a battery pack in accordance with the invention.
Figure 3:
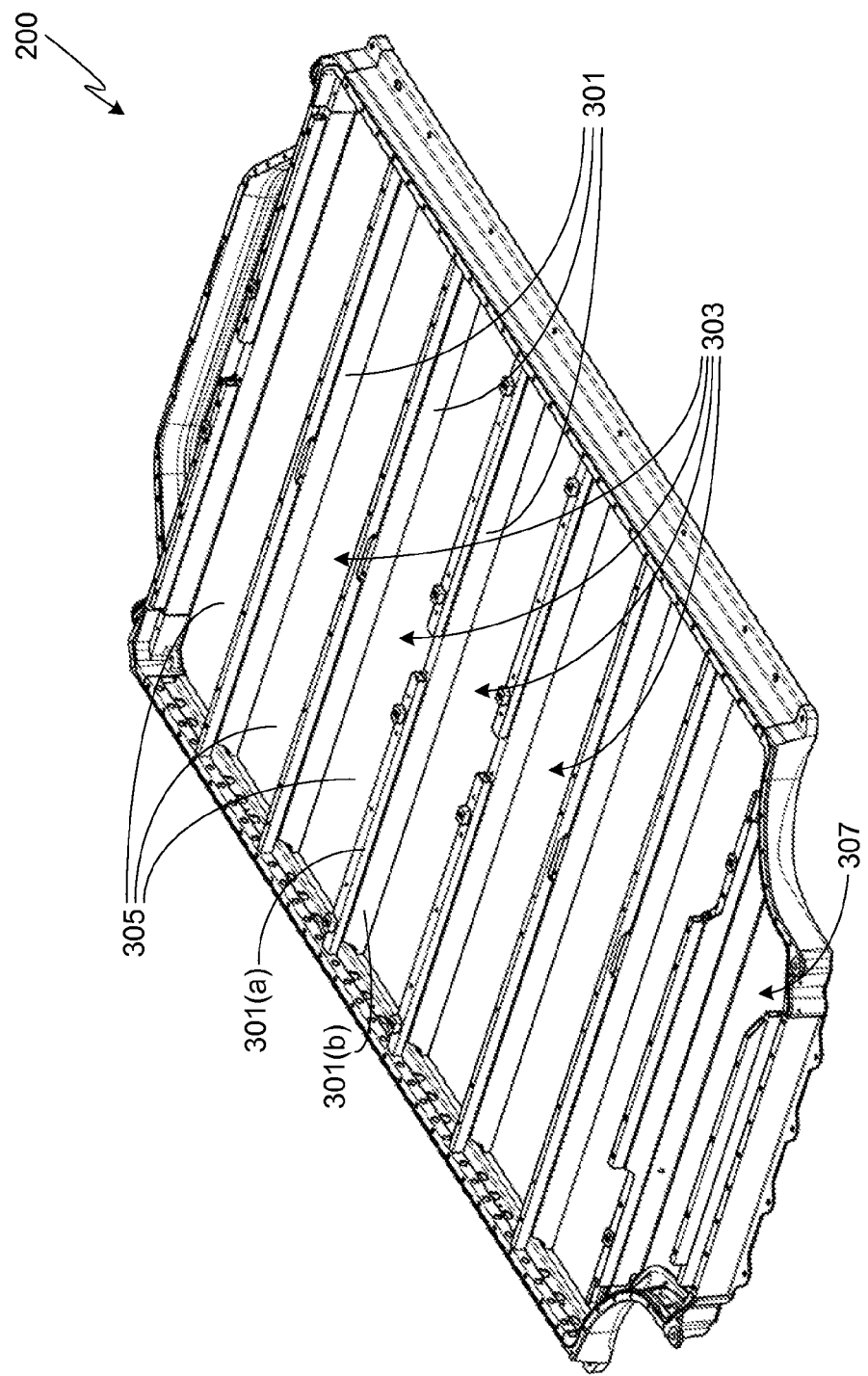
FIG. 3 provides a perspective view of the battery pack shown in FIG. 2, with the top member removed.

FIG. 2 provides a perspective view of a battery pack 200 in accordance with the invention. In this view, the battery pack is shown closed by a top member 201. Hollow side structural elements 203 are also visible, members 203 including an extended region or lip 205 which is used to mechanically and thermally couple the side members 203 to the vehicle structure (not shown). FIG. 3 shows battery pack 200 with top member 201 removed. In this view, several cross-members 301 are shown. Cross-members 301 provide several benefits. For example, members 301 provide mechanical and structural strength to the battery pack. Additionally, members 301 may be designed to be integrated into the vehicle's structure in such a way as to improve the vehicle's performance (e.g., vehicle stiffness, vehicle impact resistance, etc.). With respect to the present invention, cross-members 301 help to segregate thermal events by providing a thermal barrier between groups of cells as well as minimizing gas flow between sections 303, sections 303 being defined by cross-members 301, side members 203, top member 201 and bottom member 305. By segregating thermal events within smaller groups of cells, thermal runaway propagation is limited as is the potential for battery pack damage. Furthermore, by limiting the extent to which a thermal runaway event may propagate throughout the battery pack, the amount of hot gas and material generated and expelled through the pack's exhaust ports 119 is also limited, which in turn limits the risk of personal harm and property damage.

Figure 5:
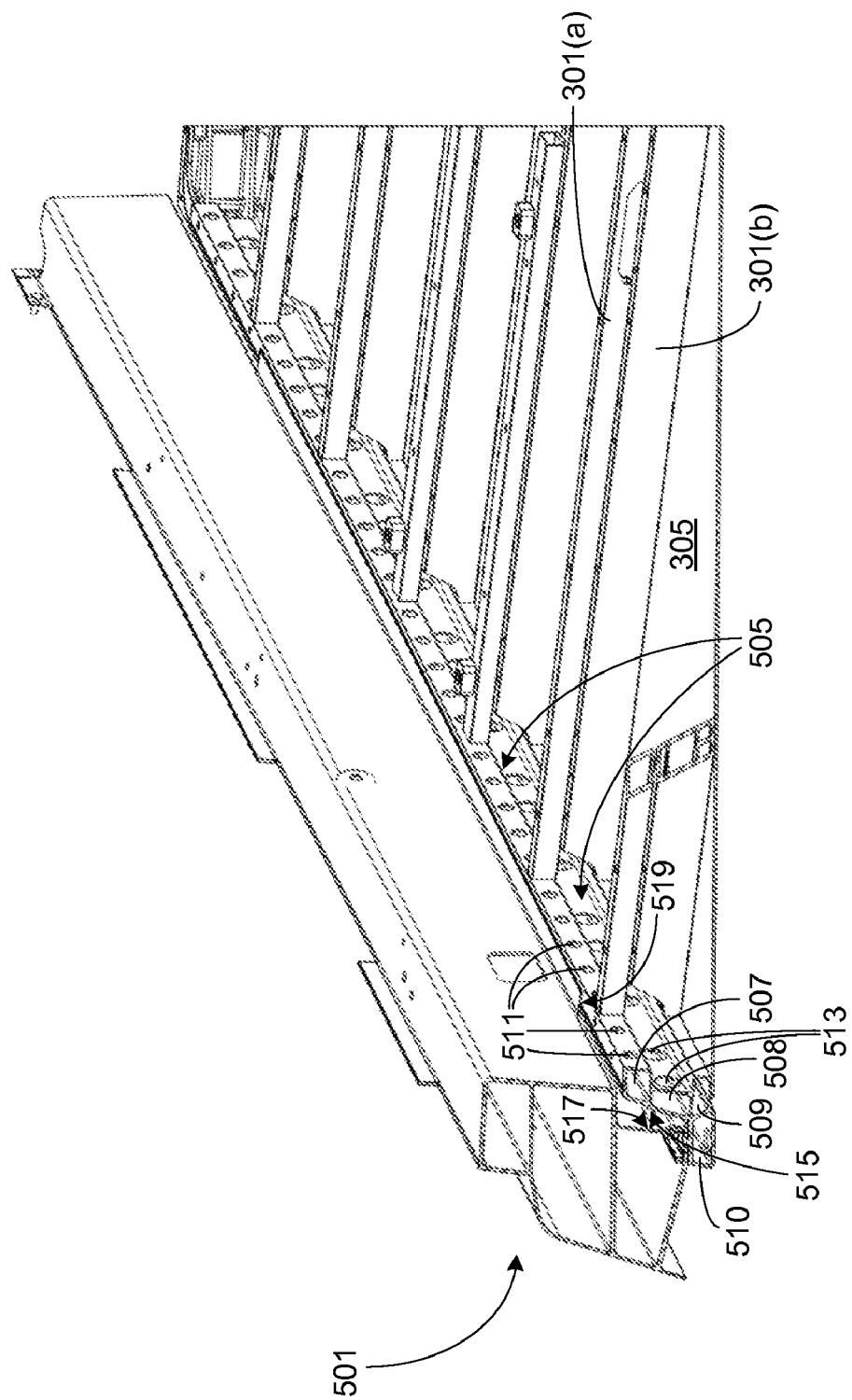
FIG. 5 provides a perspective, cross-sectional view of a portion of the battery pack shown in FIGS. 2-4 integrated into a vehicle.

Cross-members 301 may be comprised of a single unit or, as preferred and illustrated in FIGS. 3 and 5, comprised of an upper member 301(a) and a lower member 301(b). One or both members may be hollow, thus achieving the desired rigidity and strength with minimal weight. In the illustrated embodiment, upper cross-members 301(a) each include a single lumen while lower cross-members 301(b) each include three lumens. Preferably cross-members 301 (e.g., upper cross-members 301(a) and lower cross-members 301(b)) are fabricated from aluminum or an aluminum alloy using an extrusion process. It will be appreciated that variations on this configuration may be used, depending upon both the thermal and the mechanical design goals set for the cross-members. For example, rather than utilize a metal, cross-members 301 may be comprised of a high melting temperature, low thermal conductivity material (e.g. a ceramic). Alternately, the lumens within cross-members 301 may be filled with a high melting temperature, low thermal conductivity material (e.g., fiberglass or similar materials). Alternately, the lumens within the cross-members may include a liquid (e.g., water), the liquid being either stagnant or flowing. If stagnant, the liquid may be contained within the lumens themselves or, as preferred, contained within pouches that fit within the lumens. If the liquid is flowing, it is preferably contained within tubing that is inserted within the cross-member lumens and either coupled to a battery cooling system or used in a stand-alone circulation system.

Figure 4:
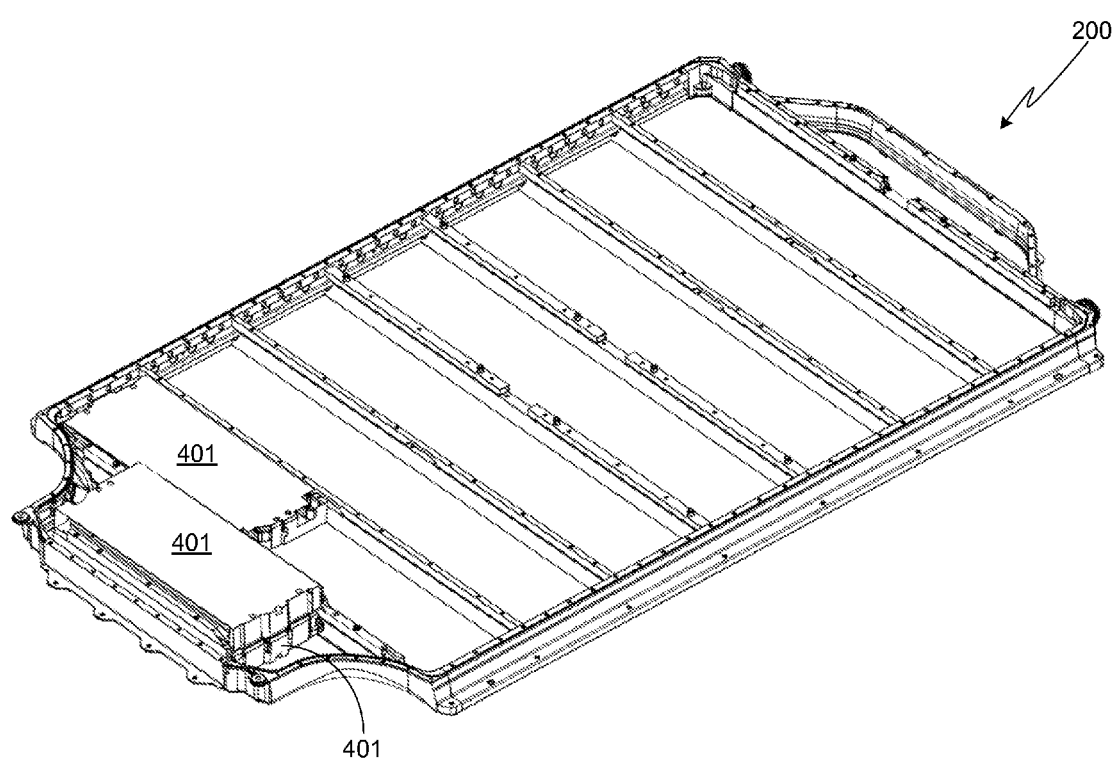
FIG. 4 provides a perspective view of the battery pack shown in FIGS. 2 and 3, this view showing three of the battery modules in place within the pack.

FIG. 4 is an illustration of preferred battery pack 200 with a couple of cell modules 401 in place. As shown, a single module 401 is shown positioned within one of the seven, larger sections 303 of battery pack 200. Note that each of these sections is designed to house a pair of battery pack modules 401. Additionally, in this illustration there are two modules 401 stacked one on top of the other in the front section 307 of pack 200. Note that in the preferred embodiment, each module contains 370 cells, each cell utilizing an 18650 form factor. It should be understood, however, that this configuration is only exemplary of a preferred embodiment and that the invention is equally applicable to other configurations, for example utilizing batteries with a different form factor, a larger or smaller number of cells, individual cells versus modules, etc.

Figure 6:
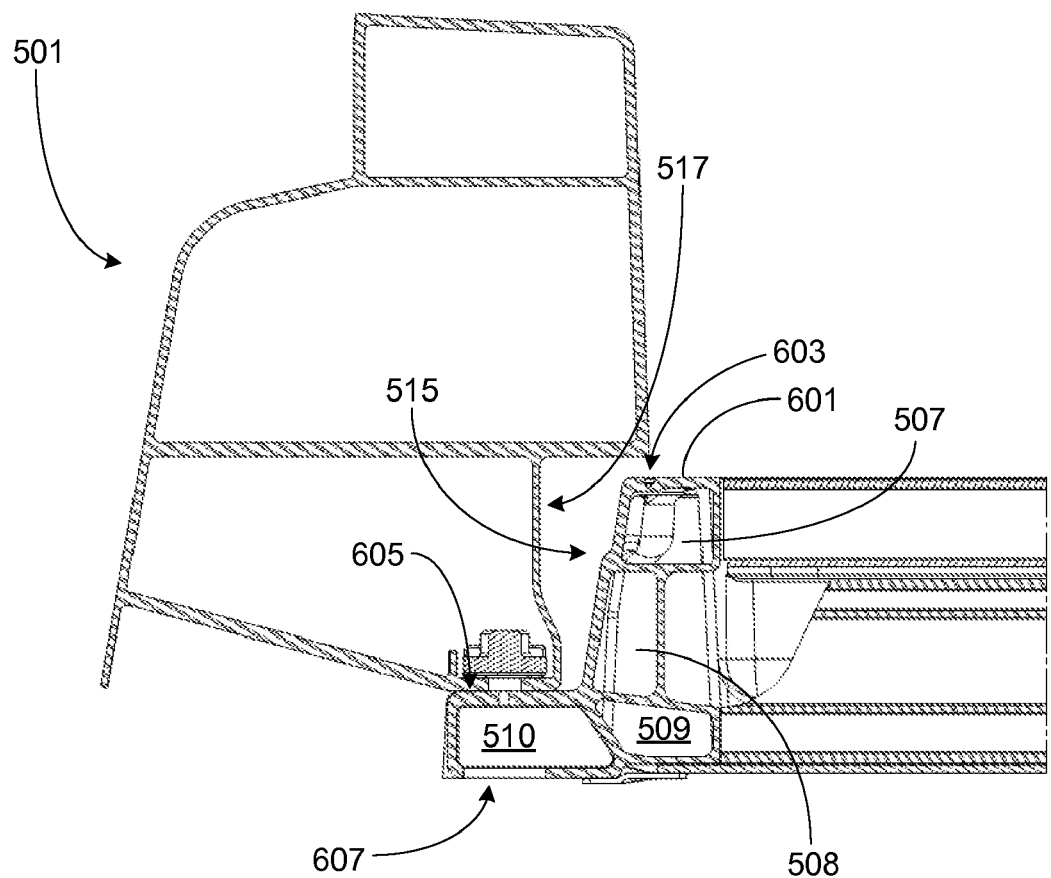
FIG. 6 provides a cross-sectional view of the portions of the battery pack and vehicle structures shown in FIG. 5.

FIG. 5 provides a perspective, cross-sectional view of a portion of battery pack 200 which has been mounted to a vehicle structural member 501. In at least one preferred embodiment, vehicle structural member 501 is comprised of a rocker panel. FIG. 6 shows a cross-sectional view of the same assembly as that shown in FIG. 5. In these views, bottom battery pack panel 305 is visible, as well as hollow side structural members 505. Preferably battery pack elements 305 and 505, as well as the top battery pack panel 201, are each fabricated from a light weight metal, such as aluminum or an aluminum alloy. Bottom panel 305 may be welded, brazed, soldered, bonded or otherwise attached to side members 505, with the resultant joint between panel 305 and member 505 preferably being substantially air-tight as well as being strong enough to allow bottom panel 305 to support the batteries contained within the pack. Top panel 201 is typically attached to member 505 using bolts or similar means, thus simplifying battery replacement as well as allowing battery interconnects, battery pack components, cooling system components and other battery pack components to be repaired and/or replaced. Preferably a seal or gasket is located between the top surface 601 of side members 505 and the bottom surface of the top panel 201, thus achieving a substantially air-tight seal. An o-ring groove 603 is visible in FIG. 6 for use with such a seal.

In the preferred embodiment of the battery pack, hollow side structural members 505 are formed from extruded aluminum or an aluminum alloy. In the exemplary configuration, all sides of battery pack 200 have matching, and co-aligned, lumens, thus insuring that the hot gas can flow unimpeded from one side member to an adjacent side member. In this configuration a pair of exhaust ports 119 is included, one at either corner 207 as shown in FIG. 2. By using a continuous lumen structure around the periphery of the battery pack and a pair of exhaust ports, if the pathway to one port or the port itself is damaged, for example in a vehicle collision, the hot gas generated during a thermal event still has a viable escape path.

In the illustrated battery pack, each side member 505 includes four lumens 507-510. Upper lumen 507 provides a first gas pathway and is coupled to the interior of battery pack 200 via interior side wall perforations 511. In the illustrated embodiment, perforations 511 have a diameter of 15 millimeters and a hole-to-hole spacing of about 55 millimeters. Middle lumen 508 provides a second gas pathway and is coupled to the interior of battery pack 200 via interior side wall perforations 513. In the illustrated embodiment, perforations 513 have a diameter of 25 millimeters and a hole-to-hole spacing of about 60 millimeters. In the preferred design, lower interior lumen 509 is not perforated and is used solely as a structural element, i.e., to provide rigidity and strength to side members 505 with minimal weight. Note that while lower interior lumen 509 could be used as another gas flow path, it is not preferred since debris from a thermal event is likely to block this region of side members 505.

During a thermal event, and as previously described, the hot gas generated during runaway will pass through the perforations (e.g., perforations 511 and 513) that correspond to the section 303 of the battery pack containing the affected battery or batteries. Depending upon the sealing capabilities of cross-members 301, the hot gas may or may not also pass through the perforations corresponding to adjoining sections 303. In the illustrated embodiment, the perforations within the battery pack members, e.g., perforations 511 and 513 in side members 505, are always open. In an alternate embodiment, the perforations are sealed in such a way as to minimize the flow of hot gas from one section 303, through the side member 505, and then into a different section 303. One way of sealing perforations 511 and 513 is through the use of one-way valves/seals that only allow hot gas to flow out of a section 303 into the side member 505, rather than the reverse direction of out of side member 505 and into a section 303. Alternately, perforations 511 and 513 may be sealed with a material that has a low enough melting point to melt when a battery within the adjoining section goes into thermal runaway, but a high enough melting point to prevent it from melting as hot gas passes by it as the gas flows through the side member lumens (e.g., lumens 507 and 508). Preferably in this embodiment each seal includes a small aperture (e.g., 1-3 millimeters) that promotes the passage of hot gas from the adjoining battery section 303. In yet another alternate embodiment, perforations 511 and 513 are covered with a sealing layer that is designed to fail as the pressure within the adjoining section 303 increases beyond the seal's failure point. In this embodiment, preferably the exhaust ports open very quickly, thus insuring that the pressure within the side members 505 does not increase sufficiently to cause the seals to open in adjacent sections as the gas flows through the side members. Further details relating to techniques for temporarily sealing perforations 511 and 513 are provided in copending and co-assigned U.S. patent application Ser. No. 12/798,198, filed 30 Mar. 2010, the disclosure of which is incorporated herein for any and all purposes.

Lower exterior lumen 510 resides under the extended region 205 of side member 505. Lumen 510 is perforated on upper surface 605 and lower surface 607, the perforations on these two surfaces being aligned such that bolts or similar members may pass completely through lumen 510. The bolts, not shown, that pass through lumen 510 via the upper and lower perforations are used to securely attach side members 505, and therefore battery pack 200, to the vehicle's structural members 501. In addition to providing a strong mechanical coupling, this approach allows battery pack 200 to be quickly and efficiently removed from underneath vehicle 100.

The strong mechanical coupling between vehicle structural members 501 and side members 505, specifically extended regions 205, provide an efficient thermal pathway for the thermal energy transferred from the hot gas to the side members to be efficiently transferred to the vehicle's structure via conduction. Additionally, thermal energy may be transferred via heat radiation between side surfaces 515 of side members 505 and surfaces 517 of the structural members 501. Similarly, thermal energy may be transferred via heat radiation between the surface edge of top panel 201 and surfaces 519 of the structural members 501. Accordingly, as a result of this configuration, the heat generated during a thermal runaway event is efficiently transferred to the battery pack side members 505 and the structural members 501, thereby dramatically reducing the temperature of the hot gas before it escapes the confined regions of the battery pack and enters the ambient environment.

Figure 7:
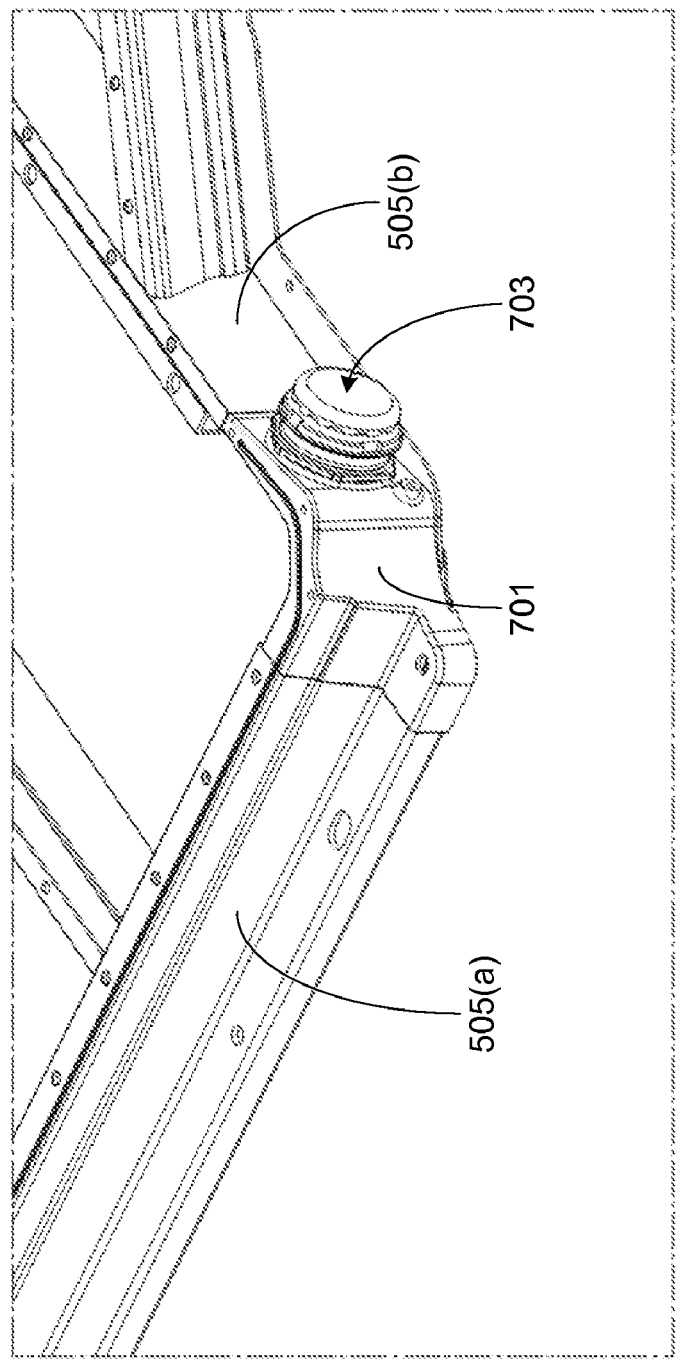
FIG. 7 provides a perspective view of a corner member used in the battery pack shown in FIGS. 2-6.

As noted above, in the configuration of the preferred battery pack 200, the gas exhaust nozzles are fitted to the rear pack corners 207. FIG. 7 provides a perspective view of a corner member 701 attached to a first side member 505(a) and a second side member 505(b). As previously noted, preferably the lumens within each side member are coupled to one another, thereby allowing gas to flow between side members. Coupled to the rear of corner member 701 is a gas exhaust port 703. In this view, the optional, but preferred, nozzle is not shown.

Figure 8:
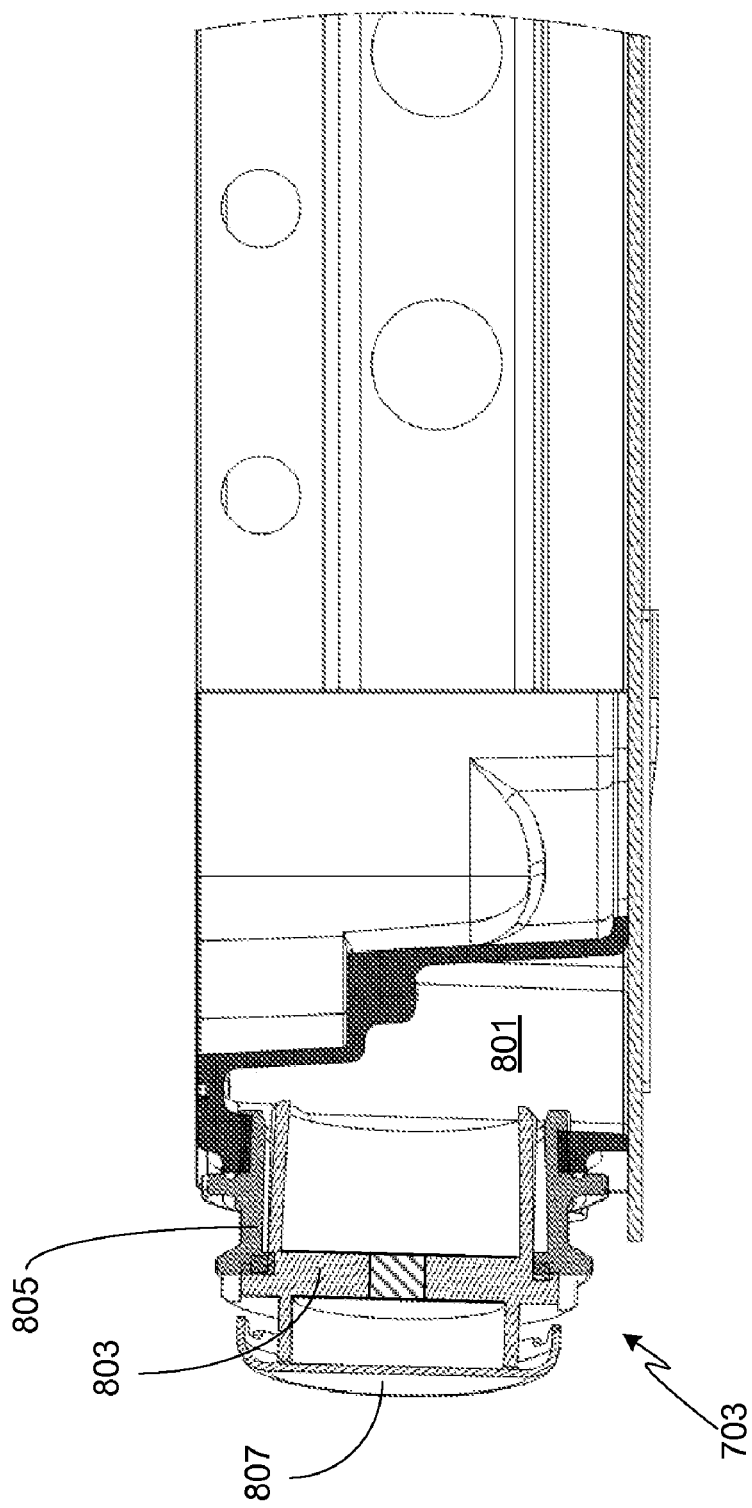
FIG. 8 provides a cross-sectional view of a portion of the corner member and gas exhaust port shown in FIG. 7.

FIG. 8 provides a cross-sectional view of a portion of corner member 701 taken through gas exhaust port 703. As shown, in the preferred embodiment corner member 701 includes a single cavity 801, thus allowing the individual lumens of side members 505 (e.g., lumens 507-510) to flow into this single cavity. Gas exhaust port 703 has a large diameter in order to minimize back pressure and insure the flow of hot gas out of the battery pack. In the illustrated embodiment, the exhaust port has an inside diameter of 50 millimeters once valve 803 is opened/ejected, and an inside diameter of 60 millimeters once valve holding member 805 is ejected. Note that during normal use, gas exhaust port 703 is preferably closed in order to prevent debris or other material from potentially clogging the port. The exhaust port may be sealed with a valve (e.g., valve 803), a cap (e.g., cap 807), or other means configured to open up during a thermal event. In one embodiment, the pressure of the thermal event within the battery pack, and the ensuing pressure increase through side members 505 and corners 701, blows off cap 807 that otherwise seals port 703 and pressure equalization valve 803 under normal operating conditions. Then as the hot gas passes through the exhaust port, valve 803 which is preferably fabricated from plastic, becomes hot enough to start to melt. Soon after valve 803 begins to melt, it is ejected from the port by the force of the gas. In a preferred embodiment, valve 803 is held within exhaust port 703 by a valve holding member 805 that is also fabricated from a relatively low melting point material, e.g., a plastic. As a consequence, if the temperature and the volume of hot gas passing through the exhaust port is great enough, valve holding member 805 will also melt and be ejected by the flowing hot gas, thereby further increasing the area of the exhaust port. In an alternate embodiment, exhaust port 703 includes a one way valve that opens once the pressure within cavity 801 has increased sufficiently to indicate that a thermal event is under way within the battery pack. In yet another alternate embodiment, a cover such as cover 807 fits over the exhaust port, as opposed to over a valve 803 as shown, the cover comprised of a relatively thin layer of low melting point material that melts during a thermal event within the battery pack. This cover may include a very small aperture, e.g., 3-5 millimeters, thus insuring that during a thermal event the hot gas passes through the aperture. As a result of the hot gas passing through the aperture, the cover melts and completely opens up the port. In yet another alternate embodiment, the assembly closing the exhaust port looks like the assembly shown in FIG. 8. In this embodiment, however, valve 803 is made of metal and therefore is not designed to melt but rather will simply open as the pressure increases beyond the preset opening pressure. As the hot gas passes through the valve it becomes hot until eventually valve holding member 805 melts, thereby allowing both valve 803 and the holding member 805 to be ejected.

Figure 9:
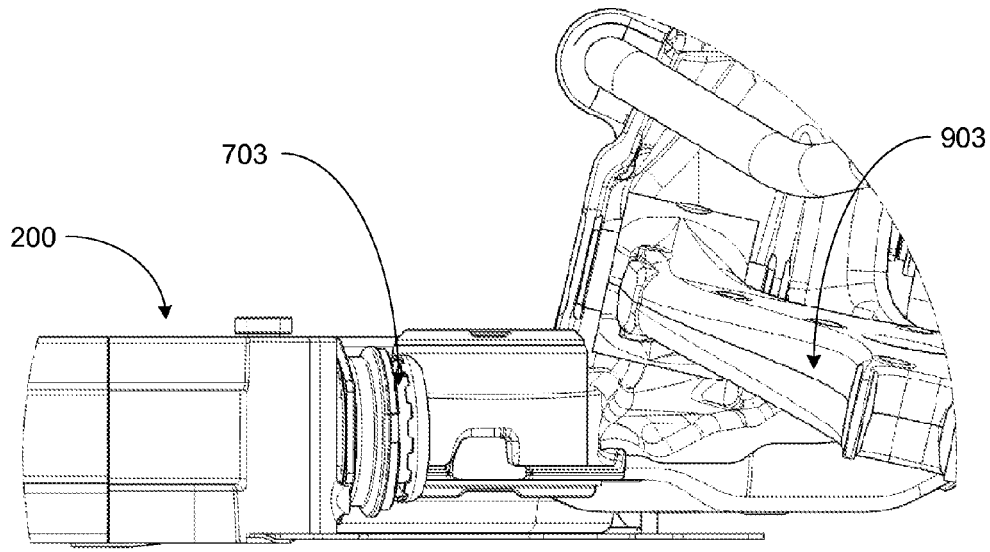
FIG. 9 provides a side view of the gas exhaust port shown in FIGS. 7 and 8.
Figure 10:
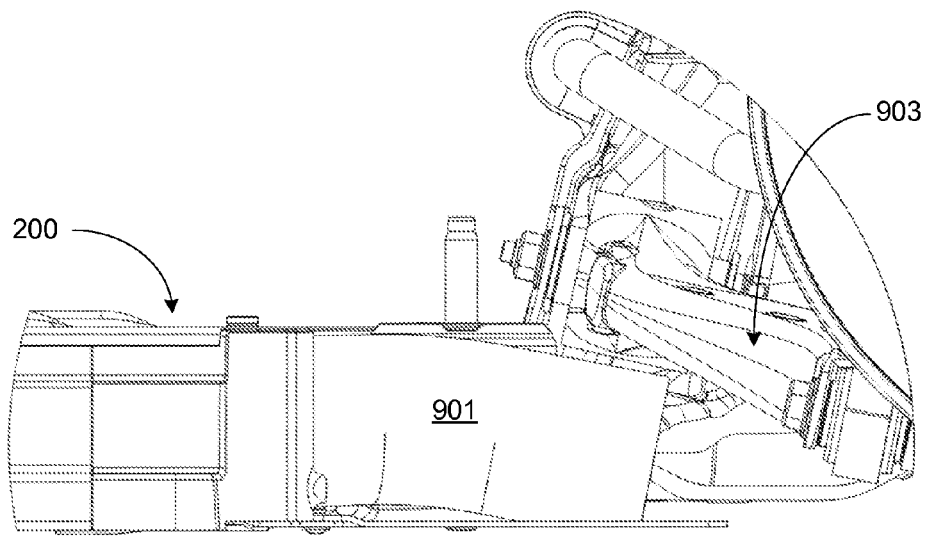
FIG. 10 provides a side view of the nozzle attached to the gas exhaust port shown in FIG. 9.
Figure 11:
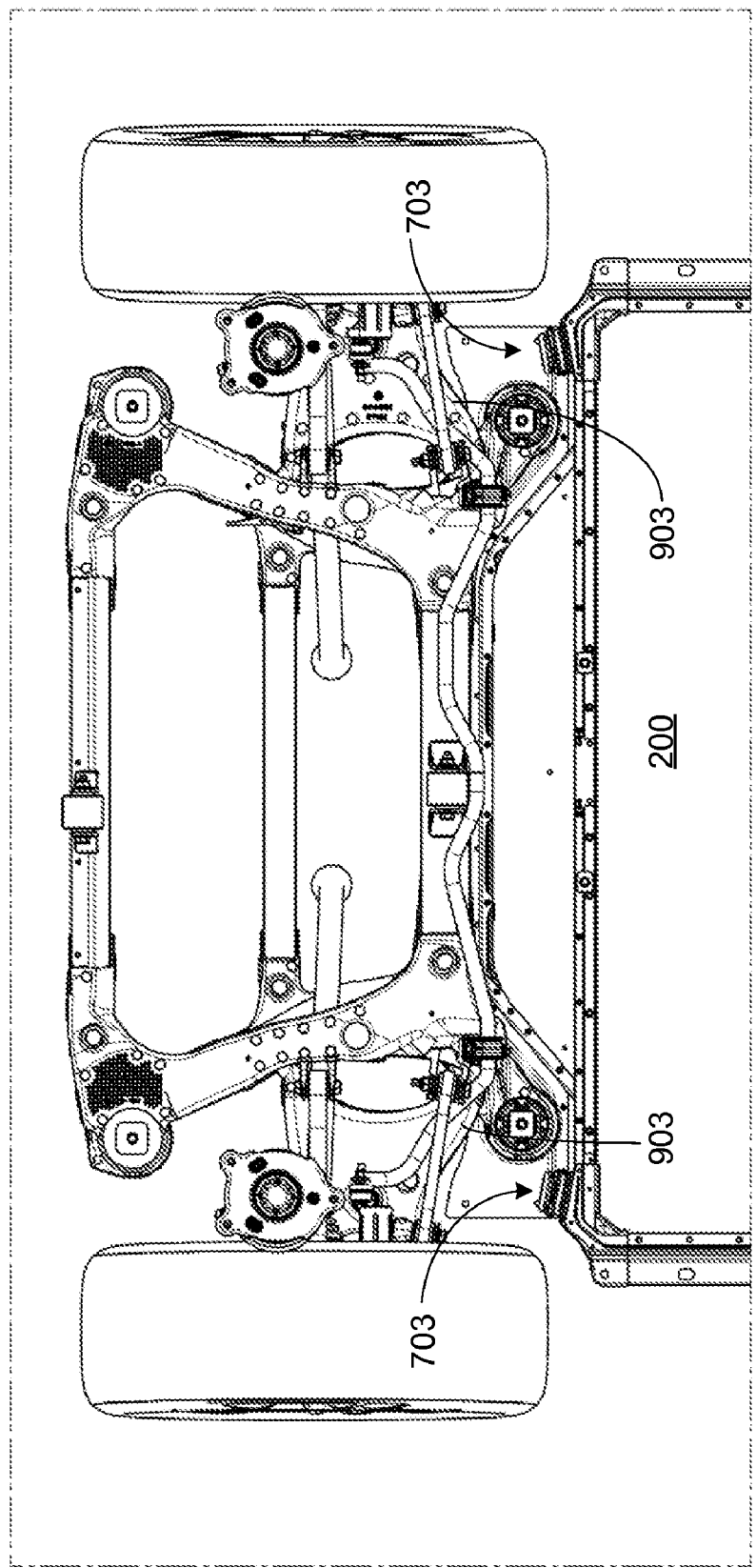
FIG. 11 provides a top view of the gas exhaust ports located on either side of the rear section of the battery pack.
Figure 12:
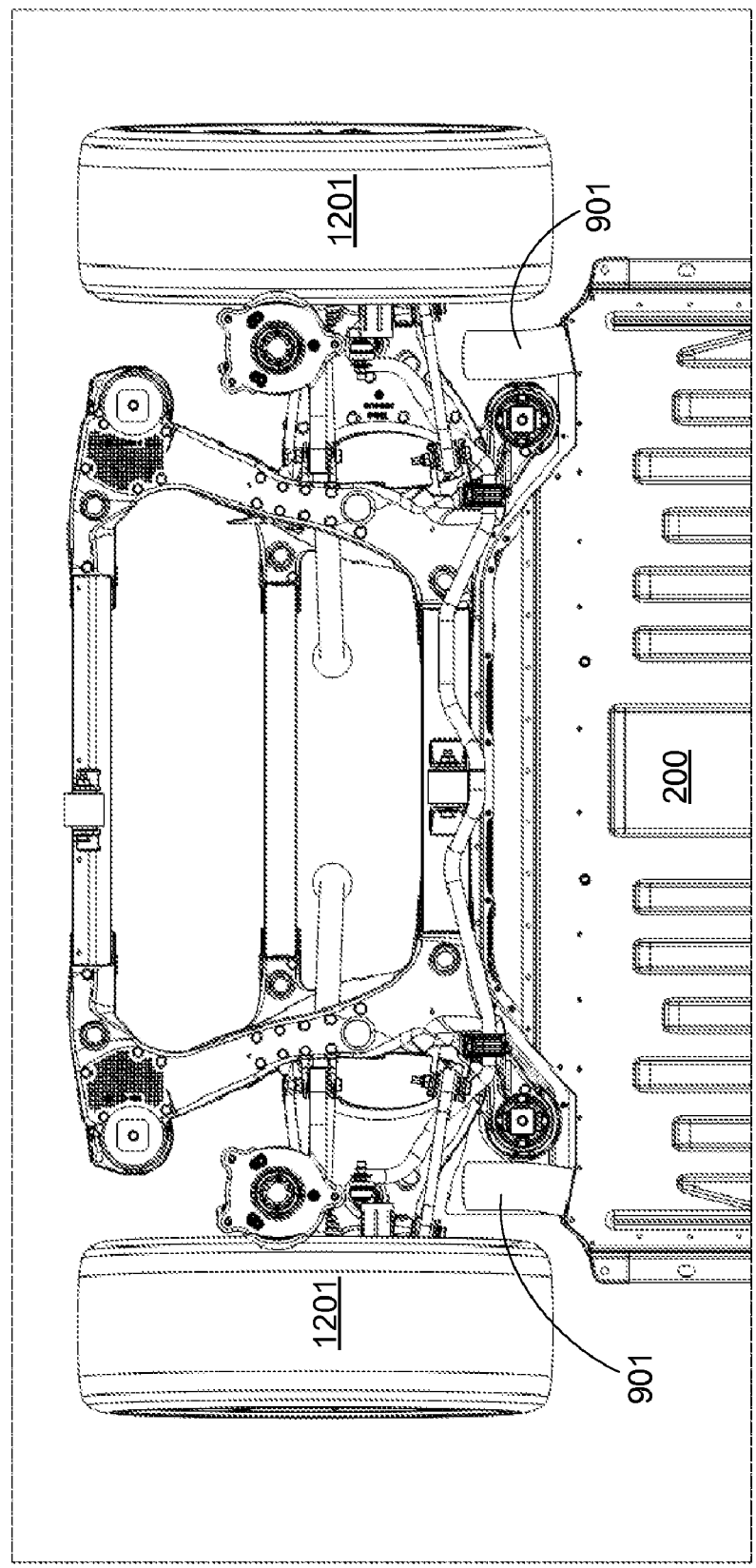
FIG. 12 provides a top view of the nozzles attached to the gas exhaust ports shown in FIG. 11.

While a simple exhaust port may be used to allow the hot gas and material generated during a thermal event within the pack to escape, preferably a nozzle is attached to the port. FIG. 9 shows a side view of a portion of battery pack 200, this view showing an exhaust port 703. FIG. 10 shows the same view as FIG. 9, with a nozzle 901 attached to gas exhaust port 703. FIG. 11 shows a top view of a portion of battery pack 200, this view showing an exhaust port 703 located on either corner member 701. FIG. 12 shows the same view as FIG. 11, with a nozzle 901 attached to each exhaust port. As previously noted, preferably the gas exhaust ports are located on the rear corners of the battery pack, although it will be appreciated that they may be attached to other locations, e.g., front battery pack corners, side battery pack sections, etc.

Nozzles 901 are relatively short, typically in the range of 12 to 18 centimeters, thus insuring that during a thermal event the gas exhaust assembly 703, or portions of the assembly (e.g., cap member 807, valve 803, valve holding member 805, etc.), do not remain lodged within the nozzle, thereby preventing efficient gas flow. In this embodiment, and as shown in FIG. 10, each nozzle 901 directs the flow of hot gas slightly downward, i.e., towards the ground, thus preventing the hot gas from impinging on and overheating the passenger compartment as well as drive train and suspension components located in this region (e.g., components 903). Additionally, as exhaust ports 703 are angled slightly towards the vehicle's centerline (see FIG. 11), preferably each nozzle 901 is angled slightly outwards as shown in FIG. 12, thus minimizing the flow of hot gas onto drive train and suspension components as well as on vehicle tires 1201. In at least one embodiment, each nozzle 901 directs the flow of hot gas onto a lower portion of control arm 903, thus allowing the control arm to further deflect the flow of hot gas away from the vehicle.

It will be appreciated that while the description and figures provided above describe a preferred embodiment, the inventors envision that other configurations may employ the same concepts both as a means of controlling the flow of hot gas generated during a thermal event occurring within a battery pack and as a means of controlling the temperature of the escaping gas. The specifics of the present configuration are clearly due, at least in part, on the size of the battery pack, the location of the battery pack within the vehicle, and the location of the battery pack relative to the passenger compartment, drive train components, and other vehicle structures. Therefore, depending upon the design of the vehicle or other application for which the battery pack is intended as well as the specifics of the battery pack itself, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack thermal management system, comprising:
   a multi-sided, substantially airtight battery pack enclosure configured to hold a plurality of batteries, wherein an inner enclosure wall corresponding to at least one side member of said battery pack enclosure includes a plurality of perforations, said perforations configured to pass gas from within said battery pack enclosure to a first extended hollow region within said at least one side member; and
   at least one gas exhaust port integrated into an outer wall of said battery pack enclosure, wherein said at least one gas exhaust port is in gaseous communication with said first extended hollow region of said at least one side member, and wherein said at least one gas exhaust port is configured to pass gas from within said first extended hollow region to an ambient environment external to said battery pack enclosure when at least one battery of said plurality of batteries enters into thermal runaway.

2. The battery pack thermal management system of claim 1, said at least one gas exhaust port further comprising a cap assembly, said cap assembly configured to seal said at least one gas exhaust port during normal operation of said plurality of batteries, and wherein said cap assembly is configured to unseal and pass gas from within said first extended hollow region to said ambient environment when said at least one battery of said plurality of batteries enters into thermal runaway.

3. The battery pack thermal management system of claim 2, said cap assembly further comprising a one-way valve.

4. The battery pack thermal management system of claim 3, said cap assembly further comprising a valve mounting member, wherein said valve mounting member is mounted within said gas exhaust port and wherein said valve is mounted within said valve mounting member, wherein said valve mounting member is configured to melt during said thermal runaway.

5. The battery pack thermal management system of claim 2, said cap assembly further comprising a cap assembly cover, wherein said cap assembly cover is configured to melt during said thermal runaway.

6. The battery pack thermal management system of claim 1, said at least one gas exhaust port further comprising a nozzle, said nozzle configured to direct said gas expelled from within said first cavity to said ambient environment.

7. The battery pack thermal management system of claim 1, wherein each of said plurality of perforations further comprise a one-way valve that is configured to allow passage of gas from within said battery pack enclosure to said at least one cavity during said thermal runaway.

8. The battery pack thermal management system of claim 1, wherein each of said plurality of perforations is temporarily sealed with a sealing layer designed to fail at a preset pressure.

9. The battery pack thermal management system of claim 1, wherein a second portion of said inner enclosure wall of said at least one side member includes a second plurality of perforations, said second plurality of perforations configured to pass gas from within said battery pack enclosure to a second extended hollow region within said at least one side member.

10. The battery pack thermal management system of claim 9, wherein said at least one gas exhaust port is in gaseous communication with said first extended hollow region and said second extended hollow region, wherein said at least one gas exhaust port is configured to pass gas from within said first extended hollow region and said second extended hollow region to said ambient environment external to said battery pack enclosure when said at least one battery of said plurality of batteries enters into thermal runaway.

11. The battery pack thermal management system of claim 10, said at least one gas exhaust port further comprising a cap assembly, said cap assembly configured to seal said at least one gas exhaust port during normal operation of said plurality of batteries, and wherein said cap assembly is configured to unseal and pass gas from within said first extended hollow region and said second extended hollow region to said ambient environment when said at least one battery of said plurality of batteries enters into thermal runaway.

12. The battery pack thermal management system of claim 11, said cap assembly further comprising a one-way valve.

13. The battery pack thermal management system of claim 12, said cap assembly further comprising a valve mounting member, wherein said valve mounting member is mounted within said gas exhaust port and wherein said valve is mounted within said valve mounting member, wherein said valve mounting member is configured to melt during said thermal runaway.

14. The battery pack thermal management system of claim 11, said cap assembly further comprising a cap assembly cover, wherein said cap assembly cover is configured to melt during said thermal runaway.

15. The battery pack thermal management system of claim 10, said at least one gas exhaust port further comprising a nozzle, said nozzle configured to direct said gas expelled from within said first extended hollow region and said second extended hollow region to said ambient environment.

16. The battery pack thermal management system of claim 9, wherein each of said plurality of perforations further comprise a corresponding first one-way valve that is configured to allow passage of gas from within said battery pack enclosure to said first extended hollow region during said thermal runaway, and wherein each of said second plurality of perforations further comprise a corresponding second one-way valve that is configured to allow passage of gas from within said battery pack enclosure to said second extended hollow region during said thermal runaway.

17. The battery pack thermal management system of claim 9, wherein each of said plurality of perforations and each of said second plurality of perforations is temporarily sealed with a sealing layer designed to fail at a preset pressure.

18. The battery pack thermal management system of claim 1, wherein said at least one side member of said battery pack enclosure is configured to be mechanically and thermally coupled to a thermal mass, wherein said thermal mass is external to said battery pack enclosure and separate from said battery pack enclosure, and wherein thermal energy from gas passing through said first extended hollow region is transferred via both thermal conduction and thermal radiation between said at least one side member of said battery pack enclosure and said thermal mass.

19. The battery pack thermal management system of claim 18, further comprising an electric vehicle, wherein said battery pack thermal management system is incorporated within said electric vehicle, and wherein said thermal mass is comprised of at least one vehicle structural member.

20. The battery pack thermal management system of claim 1, wherein said at least one side member of said battery pack enclosure is comprised of four battery pack enclosure side members, wherein each of said four battery pack enclosure side members includes said first extended hollow region, and wherein each first extended hollow region within each of said four battery pack enclosure side members is in gaseous communication with one another.

21. The battery pack thermal management system of claim 20, wherein each of said four battery pack enclosure side members is comprised of a corresponding inside enclosure wall, and wherein each inside enclosure wall corresponding to said four battery pack enclosure walls includes a portion of said plurality of perforations.

22. The battery pack thermal management system of claim 20, wherein each of said four battery pack enclosure side members comprise one side of a rectangular-shaped enclosure.

23. The battery pack thermal management system of claim 1, wherein a second portion of said inner enclosure wall of said at least one side member includes a second plurality of perforations, said second plurality of perforations configured to pass gas from within said battery pack enclosure to a second extended hollow region within said at least one side member, wherein said at least one side member of said battery pack enclosure is comprised of four battery pack enclosure side members, wherein each of said four battery pack enclosure side members includes said first extended hollow region and said second extended hollow region, wherein each first extended hollow region within each of said four battery pack enclosure side members is in gaseous communication with one another, wherein each second extended hollow region within each of said four battery pack enclosure side members is in gaseous communication with one another, wherein each of said four battery pack enclosure side members is comprised of a corresponding inside enclosure wall, wherein each inside enclosure wall corresponding to said four battery pack enclosure walls includes a portion of said plurality of perforations, wherein said plurality of perforations are configured to pass gas from within said battery pack enclosure to said first extended hollow region, wherein each inside enclosure wall corresponding to said four battery pack enclosure walls includes a portion of a second plurality of perforations, and wherein said second plurality of perforations are configured to pass gas from within said battery pack enclosure to said second extended hollow region.

24. The battery pack thermal management system of claim 23, wherein at least two of said four battery pack enclosure side members are configured to be mechanically and thermally coupled to a thermal mass, wherein said thermal mass is external to said battery pack enclosure and separate from said battery pack enclosure, and wherein thermal energy from gas passing through said first cavity and said second cavity is transferred via both thermal conduction and thermal radiation between said at least two of said four battery pack enclosure side members and said thermal mass.

25. The battery pack thermal management system of claim 24, further comprising an electric vehicle, wherein said battery pack thermal management system is incorporated within said electric vehicle, and wherein said thermal mass is comprised of a pair of vehicle structural member.

26. The battery pack thermal management system of claim 1, said battery pack enclosure further comprising a plurality of cross-members integrated within said battery pack enclosure, said plurality of cross-members segregating said plurality of batteries into groups of batteries.

27. The battery pack thermal management system of claim 26, wherein each of said plurality of cross-members presents a thermal barrier to the transfer of thermal energy between said groups of batteries located on either side of said cross-member.

28. The battery pack thermal management system of claim 27, wherein each of said plurality of cross-members includes at least one cavity.

29. The battery pack thermal management system of claim 28, wherein each of said at least one cavity within each of said plurality of cross-members is at least partially filled with a high melting temperature, low thermal conductivity material.

30. The battery pack thermal management system of claim 28, wherein each of said at least one cavity within each of said plurality of cross-members is at least partially filled with a liquid.

31. The battery pack thermal management system of claim 30, wherein said liquid within each of said at least one cavity within each of said plurality of cross-members is contained within a pouch, and wherein said liquid is stagnant.

32. The battery pack thermal management system of claim 30, wherein said liquid within each of said at least one cavity within each of said plurality of cross-members is contained within a tube, said tube running through each of said at least one cavity within each of said plurality of cross-members.

* * * * *